US006973731B2

(12) United States Patent
Aikawa et al.

(10) Patent No.: US 6,973,731 B2
(45) Date of Patent: Dec. 13, 2005

(54) ENCODER

(75) Inventors: Kazuo Aikawa, Carmel, IN (US);
Hideyasu Hayashi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 4 days.

(21) Appl. No.: 10/748,642

(22) Filed: Dec. 30, 2003

(65) Prior Publication Data

US 2005/0138822 A1 Jun. 30, 2005

(51) Int. Cl.[7] .............................................. G06M 1/27
(52) U.S. Cl. ..................................... 33/1 PT; 235/103
(58) Field of Search ................................ 33/1 PT, 1 N, 33/706, 366.24, 534; 235/103, 95 B

(56) References Cited

U.S. PATENT DOCUMENTS

| | | | |
|---|---|---|---|
| 4,674,854 A | * | 6/1987 | Kawamura et al. ......... 396/299 |
| 5,200,747 A | * | 4/1993 | Betz et al. ............. 340/870.21 |
| 5,311,666 A | * | 5/1994 | Jacobsen et al. ............ 33/1 PT |
| 5,399,981 A | * | 3/1995 | Vermesse .................... 324/714 |
| 5,838,222 A | * | 11/1998 | Al-Rawi ..................... 338/198 |
| 6,112,583 A | * | 9/2000 | Yamamura .................. 73/116 |
| 6,170,162 B1 | * | 1/2001 | Jacobsen et al. ............ 33/1 PT |
| 6,252,223 B1 | * | 6/2001 | Kamijo .................. 250/231.13 |
| 6,340,801 B1 | * | 1/2002 | Fukuda et al. ................ 200/18 |
| 6,577,984 B1 | * | 6/2003 | Clairet et al. ............... 702/151 |
| 6,688,006 B2 | * | 2/2004 | Itomi .......................... 33/1 N |
| 6,732,438 B2 | * | 5/2004 | Enzinna ..................... 33/1 PT |
| 6,828,783 B2 | * | 12/2004 | Schroter et al. ....... 324/207.25 |

FOREIGN PATENT DOCUMENTS

JP          A1 2506877          4/1996

* cited by examiner

Primary Examiner—Diego Gutierrez
Assistant Examiner—Amy R. Cohen
(74) Attorney, Agent, or Firm—Brinks Hofer Gilson & Lione

(57) ABSTRACT

Disclosed is an encoder including a rotary member and a fixed member. The fixed member is provided with an electrode having A-channel, B-channel and C-channel patterns, the rotary member is provided with contacts which are to be opposed to the electrode. A-C state switches from OFF to ON at each rotation of the rotary member for one click angle from a stable click position in both CW and CCW direction. During CW rotation for one click angle, B-C state remains unchanged from OFF; during CCW rotation for one click angle, B-C state switches twice between ON and OFF.

7 Claims, 6 Drawing Sheets

ENCODER

BACKGROUND OF THE INVENTION

1. Field of the Invention

The present invention relates to an encoder, in which as a rotary member is rotated, a state between A-channel and C-channel and a state between B-channel and C-channel switch between a conductive state and a nonconductive state, and more particularly, relates to an encoder, in which even if small-sized, a pattern of electrode can be easily formed for A-channel, B-channel and C-channel.

2. Description of the Related Art

FIG. 8 is an explanatory drawing showing a summary of a construction of a conventional rotary encoder, and FIG. 9 shows wave-form charts (A) and (B) of output from the encoder. For example, an encoder of this kind is disclosed in Japanese Patent No. 2506877.

Conductive sliders 102, 103 and 104 are provided opposite a surface of a disk-shaped substrate 100. On the surface of the substrate 100, a disk-shaped electrode 105, which is formed of a conductive material such as gold, silver and copper, is disposed. The sliders 102, 103 and 104 come into contact with the electrode 105 at three different positions aligned radially of the substrate 100.

In the electrode 105, an inner peripheral region 106 with which the G-channel slider 102 as a common slider comes into contact is formed continuously all round in a rotating direction. An intermediate region 107 with which the H-channel slider 103 comes into contact is formed such that conductive portions 107a and nonconductive portions 107b alternate with each other in the rotating direction. Likewise, an outer peripheral region 108 with which the I-channel slider 104 comes into contact is formed such that conductive portions 108a and nonconductive portions 108b alternate with each other in the rotating direction. The conductive portions 107a and nonconductive portions 107b in the intermediate region 107 are offset by only a slight angle in the rotating direction from the conductive portions 108a and nonconductive portions 108b in the outer peripheral region 108.

The nonconductive portions 107b and 108b are formed by removing part of the electrode 105 to expose a nonconductive surface of the substrate 100.

(A) of FIG. 9 shows a waveform for ON/OFF switching between the H-channel and the G-channel and a waveform for ON/OFF switching between the I-channel and the G-channel when the substrate 100 is rotated in a CW (clockwise) direction relative to the sliders 102, 103 and 104. On the other hand, (B) of FIG. 9 shows a waveform for ON/OFF switching between the H-channel and G-channel and a waveform for ON/OFF switching between the I-channel and G-channel when the substrate 100 is rotated in a CCW (counterclockwise) direction relative to the sliders 102, 103 and 104.

As the substrate 100 is rotated, the state between the H-channel and the G-channel switches between ON and OFF. When the state between the H-channel and the G-channel switches from OFF to ON and back to OFF, the value of count information in a detection circuit is counted up by "1" (in the CW direction) or counted down by "1" (in the CCW direction).

Moreover, since a phase shift Tδ is provided between ON/OFF cycle between the H-channel and the G-channel and ON/OFF cycle between I-channel and the G-channel, the rotating direction of the substrate 100 can be identified. If the state between the H-channel and the G-channel is switched to ON but the state between the I-channel and the G-channel remains unchanged from OFF after the state between the H-channel and the G-channel and the state between the I-channel and the G-channel are both OFF, the rotating direction is CW; if the state between the H-channel and the G-channel remains unchanged from OFF but the state between the I-channel and the G-channel is switched to ON after the state between the H-channel and the G-channel and the state between the I-channel and the G-channel are both OFF, the rotating direction is CCW.

In an encoder of this kind, furthermore, a click mechanism is provided between the substrate 100 and a housing which is a fixed side. For example, an outer peripheral surface of the substrate 100 is repeatedly recessed in the rotating direction and the housing is provided with a plate spring for fitting in the recesses. Accordingly, the position of the substrate 100 can be stabilized each time the substrate 100 is rotated by a predetermined angle.

In the invention disclosed in Japanese Patent No. 2506877, the substrate 100 is stabilized when the H-channel slider 103 comes into contact with the nonconductive portion 107b and the I-channel slider 104 comes into contact with the nonconductive portion 108b, i.e., at respective phases CKa, CKb, CKc, etc., as shown in FIG. 8. Japanese Patent No. 2506877 discloses that since the H-channel slider 103 and the I-channel slider 104 are electrically disconnected from each other at the time when the substrate 100 is stabilized, malfunction in circuit can be prevented.

In the conventional encoder shown in FIGS. 8 and 9, the state between the H-channel and the G-channel switches from OFF to ON and back to OFF during rotation for one click angle due to the click mechanism, e.g., during rotation from the stable position CKa to the stable position CKb, and the value of count information in the detection circuit is counted up or down by "1" at each rotation for one click operation. That is, one conductive portion 107a and one nonconductive portion 107b for one cycle portion are present within a rotation angle θ for one count up or one count down; one conductive portion 108a and one nonconductive portion 108b for one cycle portion are also present within the rotation angle θ.

Accordingly, if the diameter of the substrate 100 is decreased to produce a small-sized encoder, the area of the substrate 100 within the angle θ is extremely decreased, so that one conductive portion 107a and one nonconductive portion 107b for one cycle portion and one conductive portion 108a and one nonconductive portion 108b for one cycle portion need be disposed within such a small area. Therefore, the pattern of the electrode 105 need be precisely processed, which results in the necessity of providing a high-cost production process such as precise etching or laser processing.

In the conventional encoder which identifies the rotating direction with the phase shift Tδ provided between ON/OFF cycle between the H-channel and the G-channel and ON/OFF cycle between I-channel and the G-channel, moreover, the phase shift Tδ need be extremely small so as to switch the state between I-channel and the G-channel from ON to OFF without fail at the stable positions CKa, CKb, etc. However, if the phase shift Tδ is so small and the diameter of the substrate 100 is decreased, the dimension in the rotating direction corresponding to the phase shift Tδ becomes extremely small.

Therefore, the rotating direction of the rotary member may be erroneously detected once a slight scratch is made on the electrode 105 by sliding contact with the sliders. Such erroneous detection of the rotating direction of the rotary member may also be caused by chattering noises produced when the slider 103 passes over the boundary between the conductive portion 107a and nonconductive portion 107b and when the slider 104 passes over the boundary between the conductive portion 108a and nonconductive portion 108b.

SUMMARY OF THE INVENTION

Accordingly, it is an object of the present invention to provide an encoder which enables detection of high accuracy and prevents malfunction of a detection circuit even if an electrode pattern is relatively roughly formed within a rotation angle necessary for count up or count down and which is suitable for miniaturization.

According to the present invention, there is provided an encoder comprising: a fixed member; a rotary member; and a click mechanism for stabilizing the rotary member at each rotation for a predetermined click angle, one of the fixed member and the rotary member being provided with an electrode having A-channel, B-channel and C-channel patterns, the other being provided with contacts which are to be opposed to the electrode so that as the rotary member is rotated, a state between the A-channel and the C-channel and a state between the B-channel and the C-channel switch between a first state and a second state according to contact/noncontact between the respective contacts and the electrode, wherein one of the first state and the second state is a conductive state, and the other is a nonconductive state, wherein the state between the A-channel and the C-channel switches between the first state and the second state at each rotation of the rotary member for the click angle, as the rotary member is rotated for the click angle in one direction from a reference phase where the state between the A-channel and the C-channel is in the first state while the rotary member is stabilized by the click mechanism, the state between the B-channel and the C-channel remains unchanged from the first or second state, and as the rotary member is rotated for the click angle in an opposite direction from the reference phase, the state between the B-channel and the C-channel switches twice between the first state and the second state.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment according to the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessary obscurity of the present invention.

Figure 1:
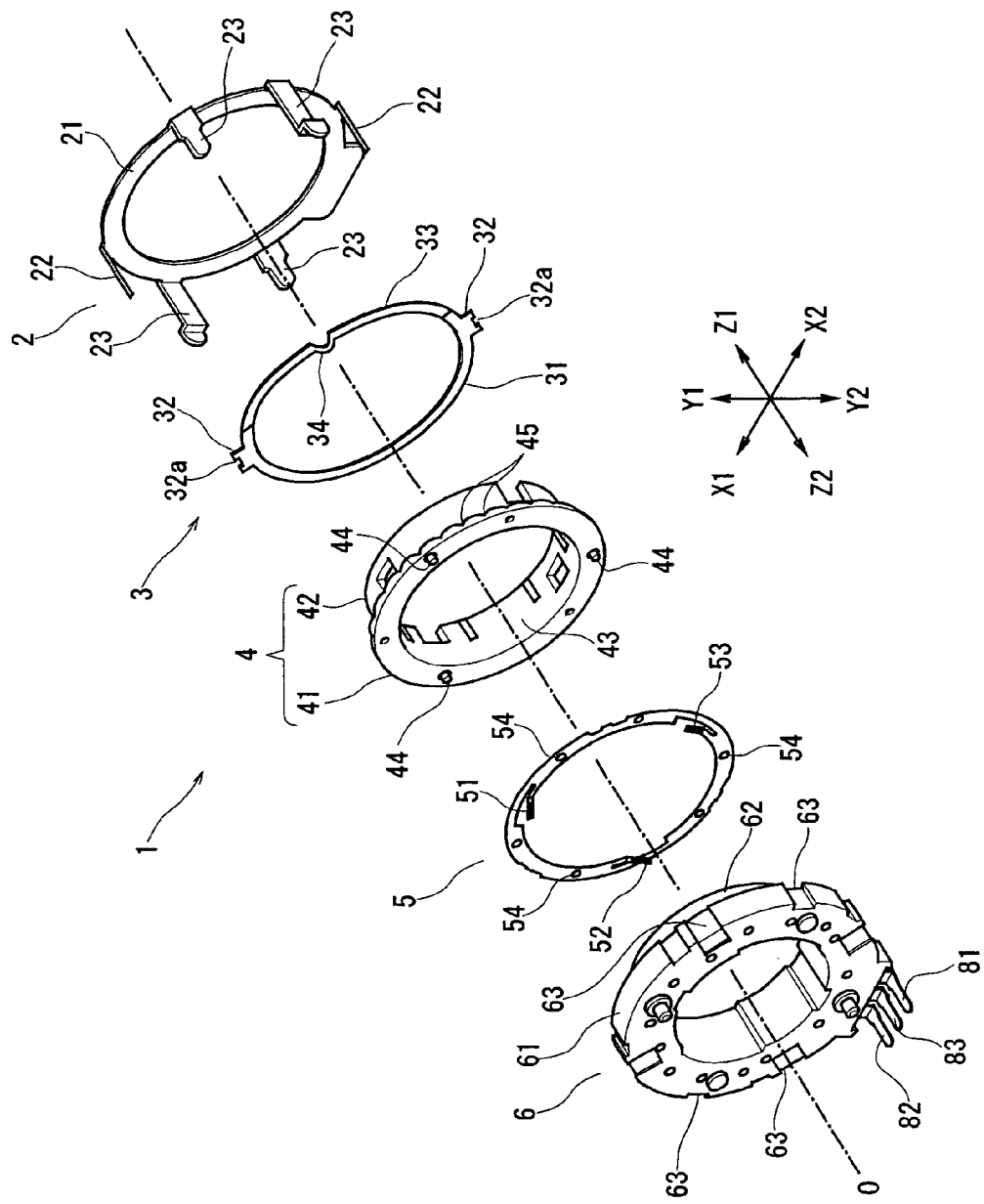
FIG. 1 is an exploded perspective view of an encoder according to one embodiment of the present invention.
Figure 2:
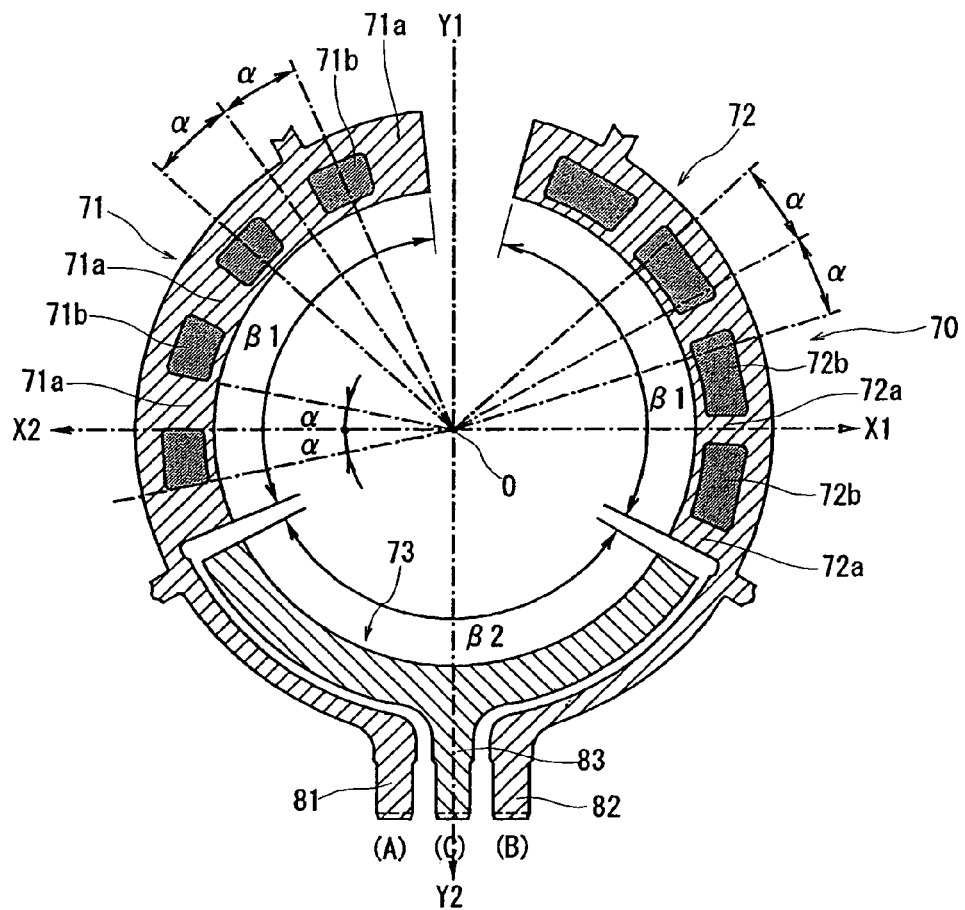
FIG. 2 is a front view of an electrode pattern.
Figure 3:
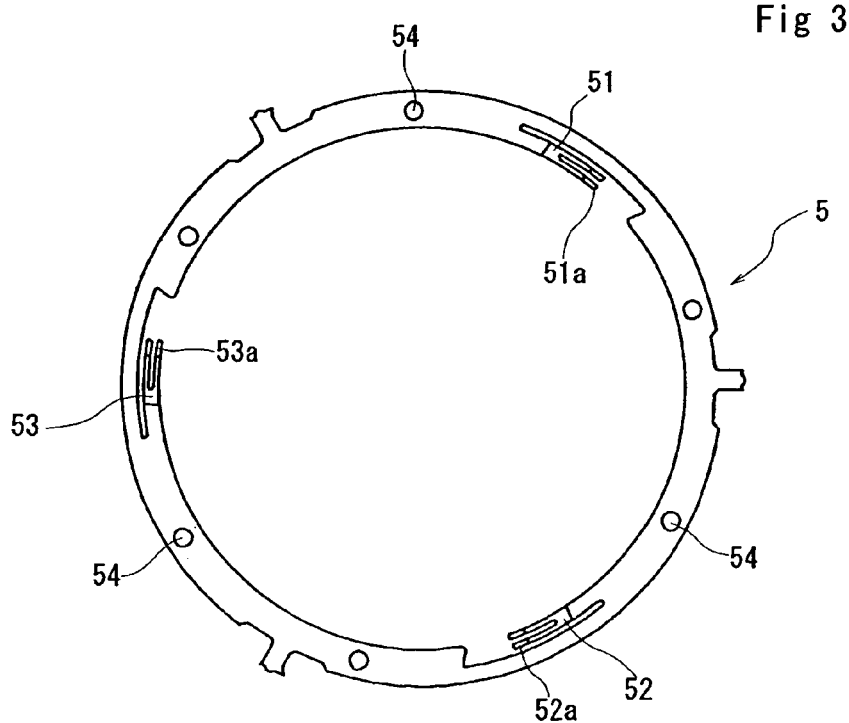
FIG. 3 is a front view of a sliding member.
Figure 4:
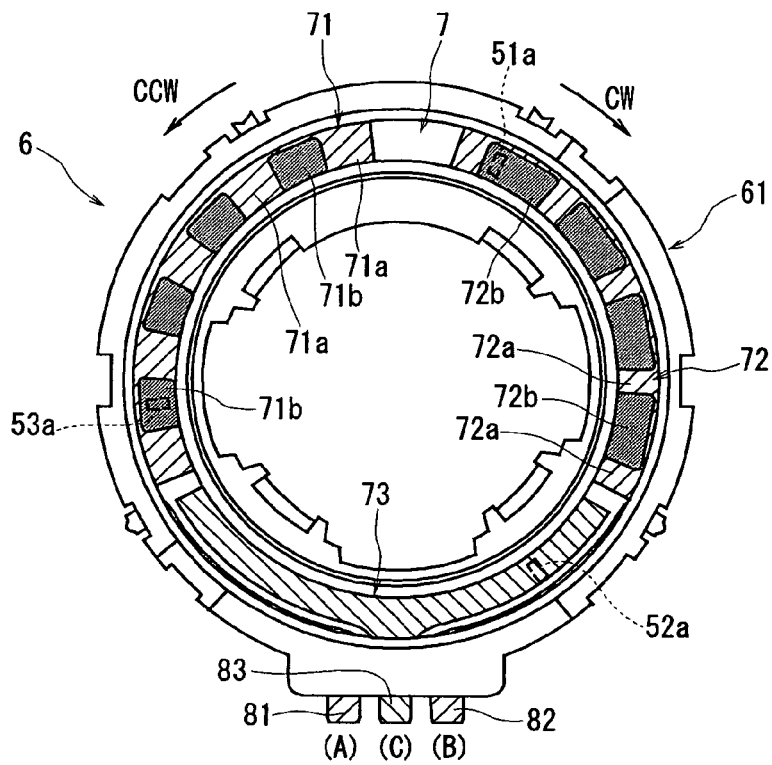
FIG. 4 is a front view showing a state where the sliding member is opposed to the electrode pattern.
Figure 5:
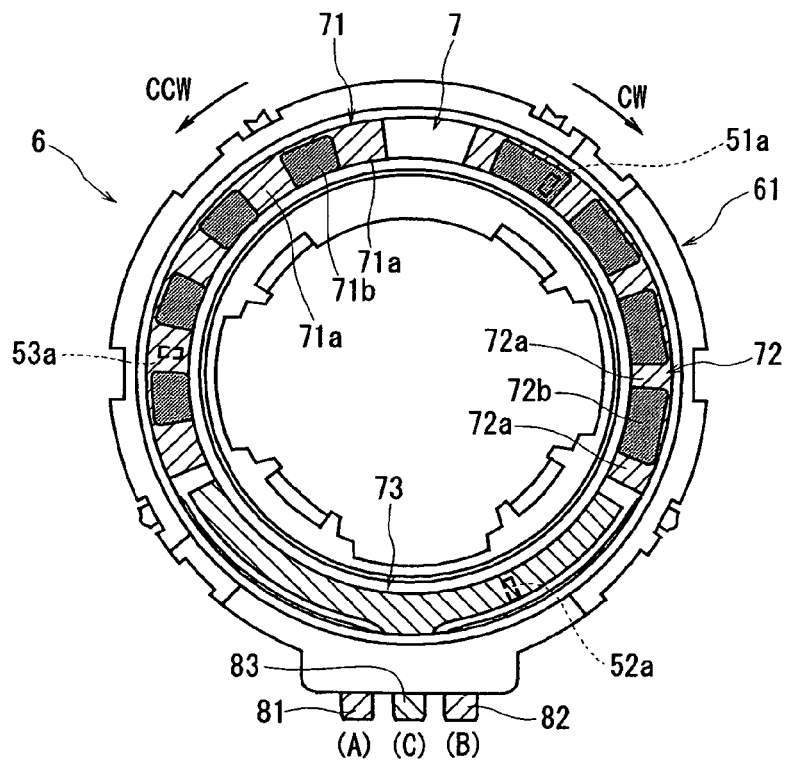
FIG. 5 is a front view showing a state where the sliding member is rotated only by one click angle from the position of FIG. 4.
Figure 6:
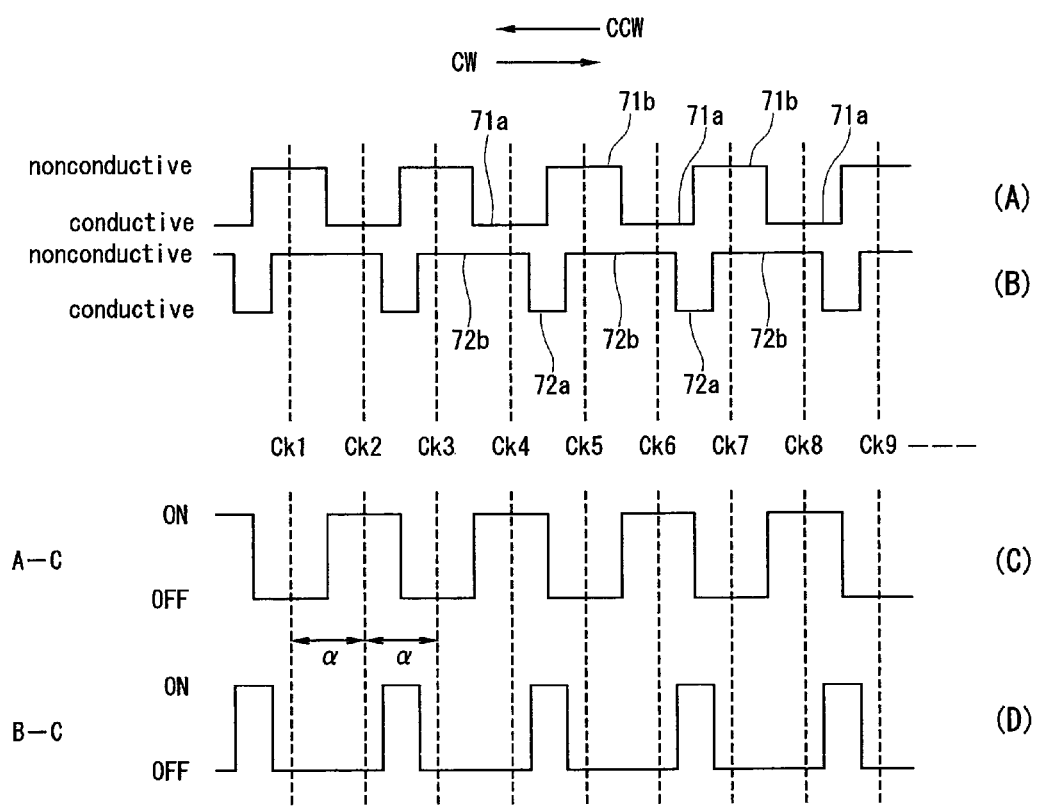
FIG. 6 is a timing diagram illustrating the operation of the encoder.
Figure 7:
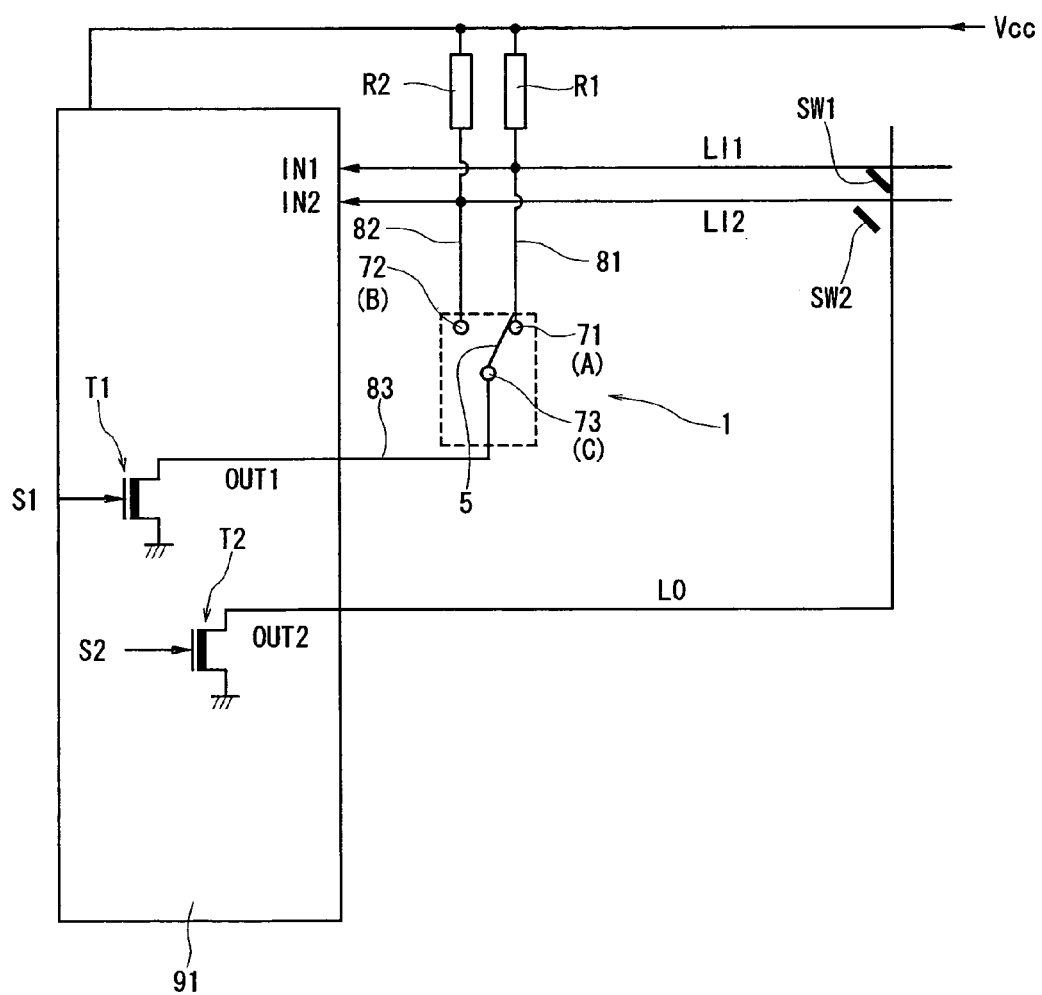
FIG. 7 is a block diagram of a circuit with the encoder.
Figure 8:
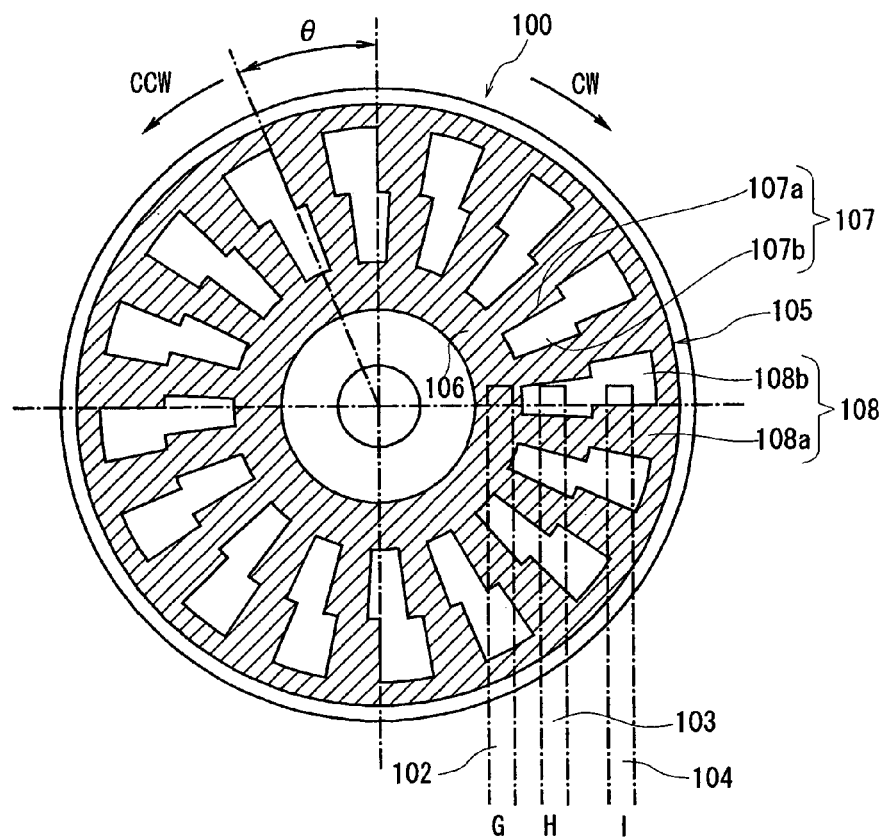
FIG. 8 is a front view showing a relationship between a substrate and sliders in a conventional encoder.
Figure 9:
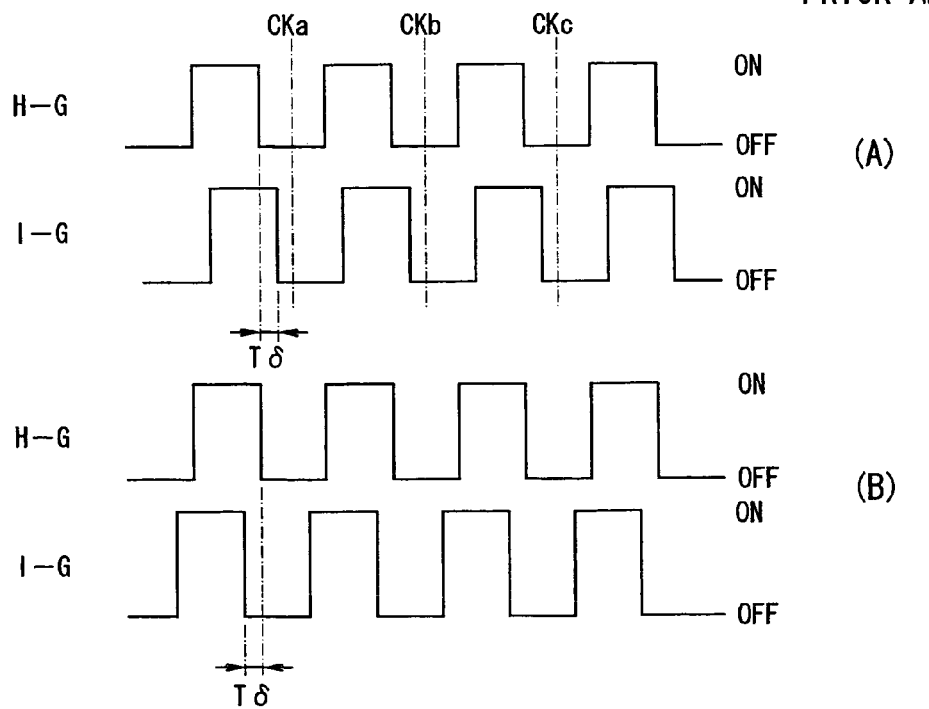
FIG. 9 shows wave-form charts of output from the encoder of FIG. 8.

FIG. 1 is an exploded perspective view of an encoder according to one embodiment of the present invention; FIG. 2 is a front view showing a pattern of an electrode provided at a fixed side; FIG. 3 is a front view showing a sliding member; FIGS. 4 and 5 are front views for describing operation of the encoder; FIG. 6 is a timing diagram illustrating the operation of the encoder; and FIG. 7 is a block diagram of a detection circuit with the encoder.

As shown in FIG. 1, an encoder 1 comprises a fixing bracket 2, a plate spring 3, a rotary member 4, a sliding member 5, a support member 6, and an electrode substrate 7 (shown in FIGS. 4 and 5).

The rotary member 4, which is integrally molded of a synthetic resin, comprises a ring-like flange portion 41 and a cylindrical operating portion 42 projecting in Z1-direction from an inner peripheral edge of the flange portion 41. The rotary member 4 is formed with a sliding hole 43 passing through in Z-direction. The flange portion 41 has three support projections 44 projecting from its Z2-side surface. On its Z1-side surface, on the other hand, the flange portion 41 has a plurality of recesses 45 which constitute a click mechanism. The recesses 45, which extend radially in the flange portion 41, are arranged at a constant pitch angle α circumferentially of the flange portion 41. The angle α is equal to an angle for one click operation in the click mechanism. To the cylindrical operating portion 42, an operating member (not shown) extending in the Z1-direction is mounted.

In FIG. 3, the sliding member 5 is shown from its Z2-side. The sliding member 5, which is formed by plating a plate spring material such as phosphor bronze with gold or silver, is stamped out into the shape of a ring. In an inner peripheral portion of the sliding member 5, a first slider 51, a second slider 52 and a third slider 53 are integrally formed. The first slider 51, the second slider 52 and the third slider 53 are spaced 120° apart from each other about a central axis O. The individual sliders 51, 52 and 53 are bent toward the Z2-side, and their free ends are bifurcated to provide sliding portions 51a, 52a and 53a, respectively.

The sliding member 5 is formed with three support holes 54. The support projections 44 formed on the rotary member 4 are fitted into the support holes 54, whereby the sliding member 5 is positioned and secured to the rotary member 4.

The support member 6 is integrally formed of a synthetic resin to have a flange portion 61 and a cylindrical portion 62 projecting in the Z1-direction from an inner peripheral edge of the flange portion 61. On the Z1-side surface of the flange portion 61, secured is the ring-like electrode substrate 7 in which an electrode is formed as shown in FIGS. 2, 4 and 5.

The cylindrical portion 62 of the support member 6 is inserted with a minimum gap into the sliding hole 43 of the rotary member 4. When thus assembled, the first slider 51, the second slider 52 and the third slider 53 of the sliding member 5 are individually elastically pressed against the surface of the electrode substrate 7. Thus, the rotary member 4 and the sliding member 5 are permitted to rotate about the central axis O.

The fixing bracket 2, which is formed of a metallic plate, has a ring-like cover portion 21, and a pair of positioning projections 22 and four retaining projections 23 are bent from the outer peripheral edge of the cover portion 21 toward the Z2-side.

The plate spring 3 is formed of a plate spring material into the shape of a ring. A pair of positioning portions 32 is formed to radially project from the outer peripheral edge of a ring portion 31, and the individual positioning portions 32 have recesses 32a at their free ends. A portion of the ring portion 31 is curved toward the Z2-side, forming a raised portion 33. The raised portion 33 is formed, at its top, with a click fitting portion 34.

The spring plate 3 is positioned and mounted on the inner surface of the cover portion 21 of the fixing bracket 2 with the positioning projections 22 of the fixing bracket 2 fitted into the recesses 32a. Then, the retaining projections 23 of the fixing bracket 2 are elastically fitted into four retaining recesses 63 formed in the outer peripheral surface of the flange portion 61 of the support portion 6. Subsequently, the retaining projections 23 are folded back. Thus, the fixing bracket 2, the plate spring 3, the rotary member 4, the sliding member 5, the electrode substrate 7 and the support member 6 are assembled into the encoder 1.

In the assembled state, the click fitting portion 34 of the spring plate 3 are elastically pressed against recesses 45 of the rotary member 4, constituting the click mechanism. A click feeling can be generated when the click fitting portion 34 is disengaged from one recess 45 and then engaged with a next recess 45 during rotation of the operating member and the rotary member 4. When no turning force is exerted on the rotary member 4, on the other hand, the click fitting portion 34 fitting in any one of the recesses 45 stabilizes the rotary member 4. That is, a click feeling can be generated at each rotation of the rotary member 4 for the angle α, and the rotary member 4 can be stabilized at each rotation for the click angle α.

FIG. 2 is a front view showing an electrode 70, which is formed on the surface of the electrode substrate 7, from the Z1-side.

The electrode 70 is formed along a circle with center at the central axis O. The electrode 70 comprises a first pattern 71, a second pattern 72 and a third pattern 73 which are electrically separated from each other. The electrode 70 is provided such that a metal plate such as a phosphor bronze plate coated with gold or the like is disposed in the electrode substrate 7 by insert molding, wherein the first pattern 71, the second pattern 72 and the third pattern 73 are formed of a conductive layer of the metal plate so as to be planar.

As shown in FIG. 1, three leading-out terminals 81, 82 and 83 formed of a metal plate are provided to the support portion 6 by insert molding, wherein the first pattern 71 is connected to the leading-out terminal 81, the second pattern 72 is connected to the leading-out terminal 82 and the third pattern 73 is connected to the leading-out terminal 83.

The first pattern 71 is an output portion for A-channel, the second pattern 72 is an output portion for B-channel, and the third pattern 73 is an output portion for C-channel. The first pattern 71 and the second pattern 72 have an equal center angle β1 about the central axis O, while the third pattern 73 has a center angle β2 about the central axis O. The angle β1 is less than 120°, while the angle β2 is slightly greater than 120°. The center of the first pattern 71 where the center angle β1 is divided in two, the center of the second pattern 72 where the center angle β1 is divided in two, and the center of the third pattern 73 where the center angle β2 is divided in two are spaced 120° apart from each other about the central axis O.

Therefore, when the rotary member 4 and the sliding member 5 is rotated in the CW or CCW direction, one of the first slider 51, the second slider 52 and the third slider 53 comes into sliding contact with the third pattern 73 without fail, so that third pattern 73 provides a common output.

In the first pattern 71, four hole-like regions, in which the conductive layer is not present but an insulating material forming the substrate 7 is exposed so as to be flush with the conductive layer, are arranged at predetermined spaced intervals. In the first pattern 71, therefore, conductive portions 71a and nonconductive portions 71b alternate with each other circumferentially. The conductive portions 71a (the nonconductive portions 71b) are arranged at a center angle (2×α) about the central axis O (α indicates the click angle), and the individual conductive portions 71a and the individual nonconductive portions 71b have a center angle equal to the click angle α about the central axis O.

Also in the second pattern 72, four hole-like regions, in which the conductive layer is not present but the insulating material forming the substrate 7 is exposed so as to be flush with the conductive layer, are arranged at predetermined spaced intervals, so that conductive portions 72a and nonconductive portions 72b alternate with each other circumferentially. The conductive portions 72a (the nonconductive portions 72b) are also arranged at a center angle (2×α) about the central axis O.

However, the center angle of the individual nonconductive portions 72b about the central axis O is larger than the click angle α. On the other hand, the center angle of the individual conductive portions 72a about the central axis O is smaller than the click angle α.

In the third pattern 73 having no nonconductive portions, the conductive layer extends circumferentially without interruption.

It should be noted that at positions between adjacent patterns of the first pattern 71, the second pattern 72 and the third pattern 73, there are provided nonconductive portions where the insulating material is exposed so as to be flush with the conductive layer.

Next, the operation of the encoder 1 will be described.

FIGS. 4 and 5 are front views showing the electrode 70 and positions of the sliding portions 51a, 52a and 53a of the sliders 51, 52 and 53 which is in sliding contact with the electrode 70, from the Z1-side of FIG. 1. In the timing diagram of FIG. 6, the operation progress when the rotary member 4 is rotated in the CW direction is shown rightward, while the operation progress when the rotary member 4 is rotated in the CCW direction is shown leftward.

In the encoder 1, during rotation of the rotary member 4 in the CW or CCW direction, one of the sliding portion 51a of the first slider 51, the sliding portion 52a of the second slider 52 and the sliding portion 53a of the third slider 53 comes into sliding contact with the third pattern 73 without fail. As the rotary member 4 is rotated, the individual sliding portions 51a, 52a and 53a slide on the three patterns 71, 72 and 73 in turn.

In (A) of FIG. 6, "CONDUCTIVE" represents a state where one of the sliding portions 51a, 52a and 53a is positioned on one of the conductive portions 71a in the first pattern 71 (which functions as the output portion for A-channel); while "NONCONDUCTIVE" represents a state where one of the sliding portions 51a, 52a and 53a is positioned on one of the nonconductive portions 71b in the first pattern 71 or a state where all the sliding portions 51a, 52a and 53a are positioned outside the first pattern 71.

In (B) of FIG. 6, "CONDUCTIVE" represents a state where one of the sliding portions 51a, 52a and 53a is positioned on one of the conductive portions 72a in the second pattern 72 (which functions as the output portion for B-channel); while "NONCONDUCTIVE" represents a state where one of the sliding portions 51a, 52a and 53a is positioned on one of the nonconductive portions 72b in the second pattern 72 or a state where all the sliding portions 51a, 52a and 53a are positioned outside the second pattern 72.

Next, (C) of FIG. 6 shows a state between the first pattern 71 (the A-channel output portion) and the third pattern 73 (the C-channel output portion), which switches between the conductive state (ON) and the nonconductive state (OFF). Hereinafter, the state between the A-channel and the C-channel is abbreviated "A-C state." When one of the sliding portions 51a, 52a and 53a is positioned on one of the conductive portions 71a and another is positioned on the third pattern 73, the first pattern 71 is electrically connected to the third pattern 73 via the sliding member 5 so that the A-C state is ON. When one of the sliding portions 51a, 52a and 53a is positioned on one of the nonconductive portions 71b, on the other hand, the first pattern 71 is electrically disconnected from the third pattern 73 so that the A-C state is OFF. The A-C state is also OFF when any one of the sliding portions 51a, 52a and 53a is not positioned on first pattern 71, for example, with one sliding portion being moving on the nonconductive portion between the first pattern 71 and the second pattern 72.

Likewise, (D) of FIG. 6 shows a state between the second pattern 72 (the B-channel output portion) and the third pattern 73 (the C-channel output portion), which switches between the conductive state (ON) and the nonconductive state (OFF). Hereinafter, the state between B-channel and the C-channel is abbreviated "B-C state." When one of the sliding portions 51a, 52a and 53a is positioned on one of the conductive portions 72a and another is positioned on the third pattern 73, the second pattern 72 is electrically connected to the third pattern 73 via the sliding member 5 so that the B-C state is ON. When one of the sliding portions 51a, 52a and 53a is positioned on one of the nonconductive portions 72b, on the other hand, the second pattern 72 is electrically disconnected from the third pattern 73 so that the B-C state is OFF. The B-C state is also OFF when any one of the sliding portions 51a, 52a and 53a is not positioned on second pattern 72, for example, with one sliding portion being moving on the nonconductive portion between the first pattern 71 and the second pattern 72.

In this embodiment, OFF is the first state and ON is the second state for both the A-C state and the B-C state. In the present invention, however, it is also possible that ON be the first state and OFF be the second state.

Here, the duty ratio of the first state (the second state) to an ON/OFF switching cycle of the A-C state is basically 50%, and one half of the ON/OFF switching cycle of the A-C state is one section which corresponds to the angle α for one click operation in the click mechanism to stabilize the rotary member 4. In FIG. 6, rotational phases where the rotary member 4 is stabilized by the click mechanism are indicated by CK1, CK2, and so on. FIG. 4 shows a state where the rotary member 4 is stabilized at a phase CK5, and FIG. 5 is a state where the rotary member 4 rotated from the position of FIG. 4 in the CW direction by the angle α for one click operation is stabilized at a phase CK6. In this embodiment, the phase CK5 at which the rotary member 4 is stabilized as shown in FIG. 4 is called reference phase, to specify a standard position of the operation.

At the reference phase CK5 (see FIG. 4), both the A-C state and the B-C state are OFF (the first state). In one section corresponding to clockwise rotation of the rotary member 4 for one click angle α from the reference phase CK5 to the phase CK6, the A-C state switches from OFF (the first state) to ON (the second state). It should be noted that the B-C state remains unchanged from OFF (the first state) in this section.

In another section corresponding to counterclockwise rotation of the rotary member 4 for one click angle α from the reference phase CK5 to the phase CK4, on the other hand, the A-C state switches from OFF (the first state) to ON (the second state), while the B-C state switches twice, i.e., switches from OFF to ON and back to OFF.

Next, the phase CK6 where the A-C state is ON (the second state), the B-C state is OFF (the first state), and the rotary member 4 is stabilized, is taken as a reference. In this case, the A-C state switches from ON (the second state) to OFF (the first state) in both sections corresponding to clockwise rotation of the rotary member 4 for one click angle α and counterclockwise rotation of the rotary member 4 for one click angle α. On the other hand, the B-C state switches twice, i.e., switches from OFF to ON and back to OFF in the section corresponding to clockwise rotation, while the B-C state remains unchanged from OFF (the first state) in the section corresponding to counterclockwise rotation.

When both the A-C state and the B-C state are OFF at the reference phase, therefore, if the B-C state remains unchanged from OFF during rotation for one section, the rotating direction is identified as CW, and if the B-C state switches twice during rotation for one section, the rotating direction is identified as CCW. When the A-C state is ON and the B-C state is OFF at the reference phase, on the other hand, if the B-C state switches twice during rotation for one section, the rotating direction is identified as CW, and if the B-C state remains unchanged from OFF during rotation for one section, the rotating direction is identified as CCW.

Because the rotating direction is thus identified, erroneous detection of the rotating direction hardly occurs.

For example, even if the conductive layer is peeled off at the boundary between the conductive portion 72a and the nonconductive portion 72b of the second pattern 72 as the B-channel output portion or chattering noises are produced when the slider passes over the boundary, the B-C state always switches twice between ON and OFF during rotation for one section from the phase CK5 to the phase CK4. Therefore, even if the passage at the boundary cannot be accurately detected due to the presence of the chattering noises or the like, the rotating direction can be identified as CCW.

In a detection circuit to which the encoder 1 is connected, if a counter is counted up or down each time the A-C state switches between ON and OFF, it becomes possible to count one pulse at each rotation of the rotary member 4 for one click angle α. For example, when the rotary member 4 is rotated in the CW direction, the counter is counted up by "1" at each rotation for the click angle α, while when the rotary member 4 is rotated in the CCW direction, the counter is counted down by "1" at each rotation for the click angle α.

In the encoder 1, since the A-C state switches only once in each section, arrangement density of the conductive portions and the nonconductive portions in the rotating direction can be made relatively low. Accordingly, even if the electrode substrate 7 is small-sized to have a small diameter or a small width, it can be produced at low cost.

Moreover, when the duty ratio of ON/OFF of the A-C state is 50%, ON/OFF switching points can be equally spaced apart from each other. Therefore, even if the angle α for one click operation is decreased or the electrode substrate 7 is small-sized, count up and count down can be carried out with high accuracy. In addition, since the ON/OFF switching occurs at positions between adjacent stable positions due to the click mechanism, pulse counting can be carried out with high accuracy by carrying out count up and count down of pulse at the switch timing.

In the encoder 1, furthermore, when the rotary member 4 is stabilized at the phases CK1, CK2, etc., as shown in FIG. 6, at least one slider is located on one of the nonconductive portions 71b in the first pattern 71 or one of the nonconductive portions 72b in the second pattern 72 or located on one of the nonconductive portions between adjacent patterns of the first pattern 71, the second pattern 72 and the third pattern 73. When the rotary member 4 is stabilized, therefore, the first pattern 71 and the second pattern 72 will never be electrically connected together via the sliding member 5, so that it becomes unnecessary to take a measure to the detection circuit against continuity between the first pattern 71 and the second pattern 72.

FIG. 7 shows a detection circuit configuration suitable for use with the encoder 1.

In the detection circuit of FIG. 7, a controller 91 is provided with output ports "OUT 1" and "OUT 2" and input ports "IN 1" and "IN 2".

The third pattern 73 (which is the C-channel output portion) of the encoder 1 is connected to the output port "OUT 1" via the leading-out terminal 83. The first pattern 71 (which is the A-channel output portion) is connected to an input line LI1 for the input port "IN 1" via the leading-out terminal 81, and also connected to a power supply voltage Vcc via a resistor R1. On the other hand, the second pattern 72 (which is the B-channel output portion) is connected to an input line LI2 for the input port "IN 2" via the leading-out terminal 82, and also connected to the power supply voltage Vcc via a resistor R2.

In the circuit shown in FIG. 7, there are provided a switch SW1 for electrically connecting an output line L0 for the output port "OUT 2" to the input line LI1 for the input port "IN 1" and a switch SW2 for electrically connecting the output line L0 for the output port "OUT 2" to the input line LI2 for the input port "IN 2".

In the controller 91, there are provided an active element T1 which is a field-effect transistor (FET) and allows the output port "OUT 1" to have the ground potential using a switching signal S1 and an active element T2 which is a field-effect transistor (FET) and allows the output port "OUT 2" to have the ground potential using a switching signal S2. The switching signals S1 and S2 are alternately applied to the active elements T1 and T2 in time-division by a predetermined period, whereby the output ports "OUT 1" and "OUT 2" are alternately allowed to have the ground potential. As shown in (C) and (D) of FIG. 6, the period of time-division is sufficiently shorter than the period of ON/OFF switching of the A-C state and the period of ON/OFF switching of the B-C state which are performed by turning the rotary member 4.

If the A-C state is switched to ON when the output port "OUT 1" has the ground potential with the switching signal S1 given to the active element T1, the input port "IN 1" has the ground potential and the input into the input port "IN 1" is "Low". If the A-C state is OFF when the output port "OUT 1" has the ground potential, no current flows into the resistor R1, and the input port "IN 1" has almost the same potential as the power supply voltage Vcc, resulting in that the input into the input port "IN 1" is "High".

Likewise, when the output port "OUT 1" has the ground potential with the switching signal S1 given to the active element T1: if the B-C state is ON, the input into the input port "IN 2" is "Low"; if the B-C state is OFF, the input into the input port "IN 2" is "High".

A CPU provided in the controller 91 can identify the switching operation shown in (C) and (D) of FIG. 6 by detecting the change in voltage of the input ports "IN 1" and "IN 2" when the output port "OUT 1" is grounded with the switching signal S1 given to the active element T1, thereby executing an up/down counting and identifying the rotating direction of the rotary member 4.

If the input line LI1 and the output line L0 are electrically connected together by the switch SW1 when the output port "OUT 2" has the ground potential with the switching signal S2 given to the active element T2, the input port "IN 1" has the ground potential and the input into the input port "IN 1" is "Low". If the input line LI1 and the output line L0 are not electrically connected together by the switch SW1 at this time, the input into the input port "IN 1" is "High". Also when the output port "OUT 2" has the ground potential: if the input line LI2 and the output line L0 are electrically connected together by the switch SW2, the input into the input port "IN 2" is "Low"; if the input line LI2 and the output line L0 are not electrically connected together, the input into the input port "IN 2" is "High".

That is, when the output port "OUT 2" has the ground potential with the switching signal S2 given to the active element T2: if the input port "IN 1" is "Low", it is recognized that the switch SW1 is in operation; if the input port "IN 2" is "Low", it is recognized that the switch SW2 is in operation.

In this detection circuit, the input ports "IN 1" and "IN 2" of the controller 91 are used not only as input ports for the encoder 1 but also as input ports for the switches SW1 and SW2 so as to simplify the circuit.

In the circuit of FIG. 7, if the first pattern 71 and the second pattern 72 were electrically connected together through the sliding member 5 when the rotary member 4 of the encoder 1 is stabilized by the click mechanism, the input line LI1 for the input port "IN 1" and the input line LI2 for the input port "IN 2" would be electrically connected together during such stable positions. At this time, if the switch SW1 is operated, both the input ports "IN 1" and "IN 2" would be "Low" when the output port "OUT 2" has the ground potential with the switching signal S2 given to the active element T2. Therefore, even though only the switch SW1 is in operation, the controller 91 would erroneously recognize that both the switches SW1 and SW2 are simultaneously operated.

In this construction, accordingly, it will be required to provide diodes or the like in the leading-out terminals 81 and 82 of the circuit for preventing the back flow of the current, whereby the circuit constitution becomes complicated.

In the encoder 1 of this embodiment, however, the first pattern 71 which is the A-channel output portion and the second pattern 72 which is the B-channel output portion will never be electrically connected together when the rotary member 4 is stabilized by the click mechanism. Therefore, it will never take place that even though only one of the switches SW1 and SW2 is in operation at the time when the rotary member 4 is stabilized by the click mechanism, both the input into the input port "IN 1" and the input into the input port "IN 2" become "Low".

Although the present invention has been illustrated and described with respect to exemplary embodiment thereof, it should be understood by those skilled in the art that the foregoing and various other changes, omission and additions may be made therein and thereto, without departing from the spirit and scope of the present invention.

For example, a substrate having an electrode may be disposed on the rotary member side while three contacts may be disposed on the fixed member side. In this construction, a pattern for A-channel, a pattern for B-channel and a pattern for C-channel are formed on the substrate disposed on the rotary member side, at different radial positions from a rotation center. The three contacts disposed on the fixed member side are permitted to slide on the three patterns, respectively, so that the contact in sliding contact with the A-channel pattern is an output portion for A-channel, the contact in sliding contact with the B-channel pattern is an output portion for B-channel, and the contact in sliding contact with the C-channel pattern is an output portion for C-channel.

The present invention should not be understood as limited to the specific embodiment set out above but to include all possible embodiments which can be embodied within a scope encompassed and equivalent thereof with respect to the feature set out in the appended claims.

What is claimed is:

1. An encoder comprising:
   a fixed member;
   a rotary member; and
   a click mechanism for stabilizing the rotary member at each rotation for a predetermined click angle, one of the fixed member and the rotary member being provided with an electrode having A-channel, B-channel and C-channel patterns, the other of the fixed member and the rotary member being provided with contacts which are to be opposed to the electrode so that as the rotary member is rotated, a state between the A-channel and the C-channel and a state between the B-channel and the C-channel switch between a first state and a second state according to contact/noncontact between the respective contacts and the electrode, wherein
   one of the first state and the second state is a conductive state, and the other of the first state and the second state is a nonconductive state, wherein
   (a) the state between the A-channel and the C-channel switches between the first state and the second state at each rotation of the rotary member for the click angle,
   (b) as the rotary member is rotated for the click angle in one direction from a reference phase where the state between the A-channel and the C-channel is in the first state while the rotary member is stabilized by the click mechanism, the state between the B-channel and the C-channel remains unchanged from the first or second state, and
   (c) as the rotary member is rotated for the click angle in an opposite direction from the reference phase, the state between the B-channel and the C-channel switches twice between the first state and the second state.

2. An encoder according to claim 1, wherein the state between the B-channel and the C-channel switches such that one of the first state and the second state continues longer than the click angle and the other of the first state and the second state continues shorter than the click angle.

3. An encoder according to claim 1, wherein when the rotary member is stabilized by the click mechanism, at least one of the A-channel pattern and the B-channel pattern of the electrode is electrically disconnected from the contacts.

4. An encoder according to claim 1, wherein the A-channel pattern, the B-channel pattern and the C-channel pattern (the three patterns) of the electrode are separated from each other, and the contacts include sliders which are electrically connected together and are opposed to the A-channel pattern, the B-channel pattern and the C-channel pattern, respectively, wherein as the rotary member is rotated, the individual sliders are permitted to slide on the three patterns in turn.

5. An encoder according to claim 4, wherein the A-channel pattern, the B-channel pattern and the C-channel pattern are spaced apart from each other in a rotating direction of the rotary member.

6. An encoder according to claim 1, wherein a duty ratio of the first/second state between the A-channel and the C-channel is 50%.

7. An encoder according to claim 1, wherein count up and count down are carried out in a detection circuit when the state between the A-channel and the C-channel switches between the first state and the second state.

* * * * *